(12) United States Patent
McNally et al.

(10) Patent No.: US 11,190,442 B2
(45) Date of Patent: Nov. 30, 2021

(54) SYSTEMS AND METHODS FOR PROVIDING TRANSPARENT ETHERNET PRIVATE LINE SERVICES USING STATIC PSEUDO-WIRE CONFIGURATION

(71) Applicant: Level 3 Communications, LLC, Broomfield, CO (US)

(72) Inventors: Jeffrey McNally, Highlands Ranch, CO (US); James Bachtel, Highlands Ranch, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 98 days.

(21) Appl. No.: 16/746,505

(22) Filed: Jan. 17, 2020

(65) Prior Publication Data

US 2020/0236040 A1  Jul. 23, 2020

Related U.S. Application Data

(60) Provisional application No. 62/795,406, filed on Jan. 22, 2019.

(51) Int. Cl.
*H04L 12/723* (2013.01)
*H04L 29/06* (2006.01)
*H04L 12/721* (2013.01)

(52) U.S. Cl.
CPC .............. *H04L 45/50* (2013.01); *H04L 45/66* (2013.01); *H04L 45/68* (2013.01); *H04L 63/0272* (2013.01)

(58) Field of Classification Search
None
See application file for complete search history.

(56) References Cited

U.S. PATENT DOCUMENTS

| 8,848,711 | B1* | 9/2014 | Pan ........................ H04L 45/68 370/392 |
| 2008/0172497 | A1* | 7/2008 | Mohan ................ H04L 12/4658 709/249 |
| 2010/0318918 | A1* | 12/2010 | Mahmoodshahi .. H04L 41/5051 715/744 |
| 2013/0287027 | A1* | 10/2013 | Ra ......................... H04L 45/745 370/392 |
| 2017/0104851 | A1* | 4/2017 | Arangasamy ....... H04L 63/0428 |

* cited by examiner

*Primary Examiner* — Jay L Vogel

(57) ABSTRACT

The present disclosure is directed to enabling transparency for network traffic through an off-net site using the concept of static Pseudo-Wire (PW) of arriving data packets at a Network Interface Device (NID). In one aspect, a method of providing transparent Ethernet private line service includes receiving, at a network interface device of an enterprise network, a packet, the enterprise network being configured to receive the Ethernet private line service from a service provider; determining, by the network interface device, whether the packet is a raw data packet or a statically pseudo-wired packet; and performing, by the network interface device, a pseudo-wire encapsulation process if the packet is the raw data packet or a pseudo-wire de-capsulation process if the packet is the statically pseudo-wired packet, prior to delivering the packet to a corresponding destination.

10 Claims, 4 Drawing Sheets

SYSTEMS AND METHODS FOR PROVIDING TRANSPARENT ETHERNET PRIVATE LINE SERVICES USING STATIC PSEUDO-WIRE CONFIGURATION

RELATED APPLICATION DATA

This application is related to and claims priority under 35 U.S.C. § 119(e) from U.S. Patent Application No. 62/795,406, filed Jan. 22, 2019 entitled "Systems and Methods for Providing Transparent Ethernet Private Line Services Using Static Pseudo-Wire Configuration," the entire contents of which is incorporated herein by reference for all purposes.

TECHNICAL FIELD

The present disclosure relates to telecommunication networks and, in particular, to providing transparent private Ethernet line services using static pseudo-wire configuration.

BACKGROUND

Ethernet Private Line (EPL) is currently a service that telecommunication network providers (service providers) provide to their customers (which can be a corporation, a university, any type of company or entity or in general any customer/client running an enterprise network within its facility/facilities). For example, EPL is a private data connection securely connecting two or more locations for private data services. An Ethernet private line circuit is a closed network data transport service which does not traverse the public Internet and is inherently secure with no data encryption needed. In many instances, a service provider may not have the necessary infrastructure (e.g., necessary cables and equipment) leading all the way into the client site. For example, when a client site is a building or a campus of a company, the service provider may have underground fiber optic cables running close to but not all the way into the client site. This may be referred to as the "last mile" to the client site. However, the telecommunication infrastructure in the "last mile" may be available through a third party service provider. Accordingly, EPL services to be provided by the service provider to the client must travel through the third party's "last mile" equipment/site. This third party equipment/site can be considered an "off-net" site from the perspective of the service provider. The use of the third parties "last mile" equipment may be costly and reduce the profit for the network providing the EPL service.

Currently, there is no economically viable solution to make the transmission of such data packets from one network node to another (and through one or more off-net sites) transparent.

It is with these observations in mind, among others, that aspects of the present disclosure were conceived.

SUMMARY

One or more example embodiments of the present disclosure are directed to enabling transparency for network traffic through an off-net site using the concept of static Pseudo-Wire (PW) of arriving data packets at a Network Interface Device (NID) sitting between various networks nodes of a customer of a telecommunication service provider.

In one aspect, a method of providing transparent Ethernet private line service includes receiving, at a network interface device of an enterprise network, a packet, the enterprise network being configured to receive the Ethernet private line service from a service provider; determining, by the network interface device, whether the packet is a raw data packet or a statically pseudo-wired packet; and performing, by the network interface device, a pseudo-wire encapsulation process if the packet is the raw data packet or a pseudo-wire de-capsulation process if the packet is the statically pseudo-wired packet, prior to delivering the packet to a corresponding destination.

In another aspect, the pseudo-wire encapsulation process includes adding an MPLS label to the raw data packet to yield a pseudo-wired packet (PW packet); and adding a Service Tag (S-Tag) to the PW packet.

In another aspect, the network interface device does not require any protocol stacking for implementing MPLS.

In another aspect, the method includes sending the PW packet to an off-net Ethernet Virtual Private Line Facility, wherein at the off-net Ethernet Virtual Private Line Facility, an Ethernet Tag (E-Tag) is added to the PW packet and transmitted to a network to network interface (NNI) for transmission to a customer premise equipment (CPE) of a customer over a metro core, and upon arrival at a site of the customer, another network interface device, performs the pseudo-wire de-capsulation process to retrieve the raw data packet for transmission to the CPE.

In another aspect, the pseudo-wire encapsulation process prevents the off-net Ethernet Virtual Private Line Facility from dropping the raw data packet by hiding content of the raw data packet from the off-net Ethernet Virtual Private Line Facility.

In another aspect, the content includes a payload, a source address, and a destination address of the raw data packet.

In another aspect, the pseudo-wire de-capsulation process includes removing a service tag of the packet; removing a pseudo-wire header of the packet to yield a raw data packet; determining a destination address of the raw data packet; and sending the raw data packet to the destination.

In one aspect, a device is configured to provide transparent Ethernet private line service, the device includes memory having computer-readable instructions stored therein; and one or more processors. The one or more processors are configured to execute the computer-readable instructions to receive a packet, the device being configured as a component of an enterprise network that receives the Ethernet private line service from a service provider; determine whether the packet is a raw data packet or a statically pseudo-wired packet; and perform a pseudo-wire encapsulation process if the packet is the raw data packet or a pseudo-wire de-capsulation process if the packet is the statically pseudo-wired packet, prior to delivering the packet to a corresponding destination.

In one aspect, one or more non-transitory computer-readable media includes computer-readable instructions, which when executed by one or more processors of a device of an enterprise network, cause the device to receive a packet, the device being configured to receive transparent Ethernet private line service from a service provider; determine whether the packet is a raw data packet or a statically pseudo-wired packet; and perform a pseudo-wire encapsulation process if the packet is the raw data packet or a pseudo-wire de-capsulation process if the packet is the statically pseudo-wired packet, prior to delivering the packet to a corresponding destination.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however the emphasis instead is being placed on illustrating the principles of the technological concepts. The drawings depict only typical embodiments of the present disclosure and, therefore, are not to be considered limiting in scope.

DETAILED DESCRIPTION

Figure 1:
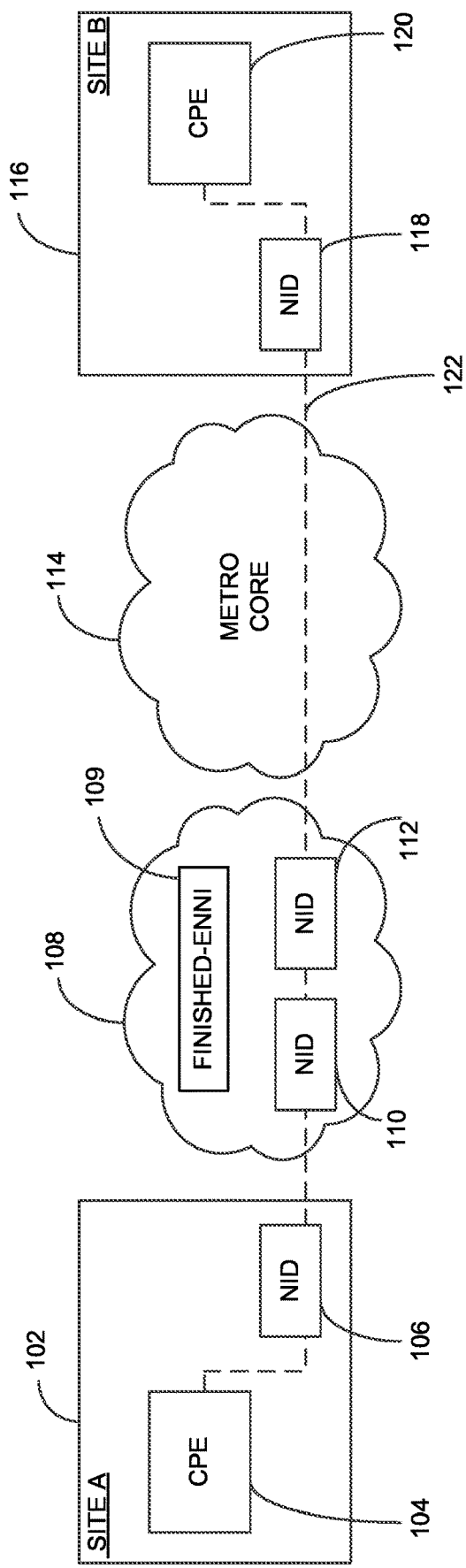
FIG. 1 illustrates an example system for providing transparent Ethernet private line services, according to an aspect of the present disclosure.

Various example embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Multiprotocol Label Switching (MPLS) is a type of data-carrying/routing technique for telecommunications networks and service providers. In general, MPLS directs data from one network node to the next based on short path labels rather than long network addresses.

Typically, a data packet originating from one network node and destined for another at, for example, the client site described above (or vice-versa), has a payload (the actual data) as well as source and destination address (MAC or IP addresses) as headers. This data packet is then propagated through the service provider's network and any off-net sites, where the data packet may be constantly modified with appropriate additional headers and tags for proper routing.

Currently, there is no economically viable solution to make the transmission of such data packets from one network node to another (and through one or more off-net sites) transparent. Transparency refers to ensuring that no data packet is dropped, at the off-net site(s), which can happen for a number of reasons. For example, an off-net switch or router can limit unicast or multicast packets to a certain small percentage with any packets received beyond that small percentage limit may be dropped. Other off-net switches may drop Layer 2 (L2) control protocols for purposes of protecting their own network.

In other words, transparency is achieved, by ensuring that the payload, the destination, and the source addresses of the data packet, all appear to the off-site router(s)/switch(es) as payloads so that no traffic packet is dropped. Stated differently, transparency aims at ensuring that all network traffic pass through the off-site router(s)/switch(es) safely and intact.

Various example embodiments will be described below, which enable transparency for network traffic through an off-net site using the concept of static Pseudo-Wire (PW) of arriving data packets at a Network Interface Device (NID) sitting between various networks nodes of a customer of a telecommunication service provider. As will be described, such NID devices and static PW encapsulation techniques implemented thereon provide an economic and relatively cheap scheme for delivering transparent EPL service to clients by a telecommunication service provider.

FIG. 1 illustrates an example system for providing transparent Ethernet private line services, according to an aspect of the present disclosure. System 100 of FIG. 1 provides a transparent EPL service to a client/customer and is operated by a service provider. System 100 includes site A 102, which can be an off-net site (operated by a third party telecommunication service provider, which is different that the service provider that provides the EPL service). Site A 102 also includes customer premise equipment (CPE) 104 (end devices 104) that sit behind NID 106. CPE 104 may include any number of interconnected equipment including video/audio equipment, computers, routers, switches, etc. CPE 104 may belong to the customer or may be external devices communicating with on-site equipment of the customer using the EPL service of system 100. CPE 104 may not necessarily be co-located within off-net site A 102 but nevertheless, are located behind NID 106 (may need to utilize off-net site A 102 and routers/switches/cables thereof to reach client's equipment at other end of system 100 (site B), which will be described below.

NID 106 can be any known or developed NID or any other type of switch or router that can provide MPLS based EPL service without requiring complex protocol stacking. As will be described below, NID 106 can be manually configured to provide static PW configuration of incoming packets destined for site B in FIG. 1.

System 100 further includes network 108, which is an off-net Ethernet Virtual Private Line (EVPL) facility utilizing Ethernet over MPLS (EoMPLS) Pseudo-Wires with static labels.

Network 108 includes a Finished-Ethernet External Network to Network Interface (Finished E-ENNI) 109, Network to Network (NN) component 110 (which can be a switch or a router) and a Metro Ethernet (ME) switch/router 112 that can communicate with On-net site B 116 over metro core network 114. Metro core 114 can include any number of known or to be developed components such as cables, router, switches, etc. that are operated by service provider of EPL service to client at site B 116.

Site B 116 also includes another NID 118, which can be any type of switch or router that can provide MPLS based EPL service without requiring complex protocol stacking. An example of NID 118 can be a Cisco ME-3600X-24CX switch or a Cisco ASR920 switch.

Connected to NID 118 is CPE 120 (end device 120), which can include any number of connected equipment working within an enterprise network of the client/customer to which a transparent EPL service is provided by the service provider of system 100 according to examples described herein.

Site A 102 and Site B 116 can be any type of end point such as a building or an open air area in which the enterprise network of the client is operating, such as, but not limited to, a closed building, a stadium, a campus of multiple connected or disjoint buildings, etc.

In system of FIG. 1, NIDs 106 and 118 are operated by service provider of transparent EPL service and not any of the third party telecommunication providers operating off-net site 102 or off-net network 108.

Furthermore, FIG. 1 illustrates a path 122 through various components of system 100, taken by data packets originating from or destined for any CPE 104 or CPE 120.

Figure 2:
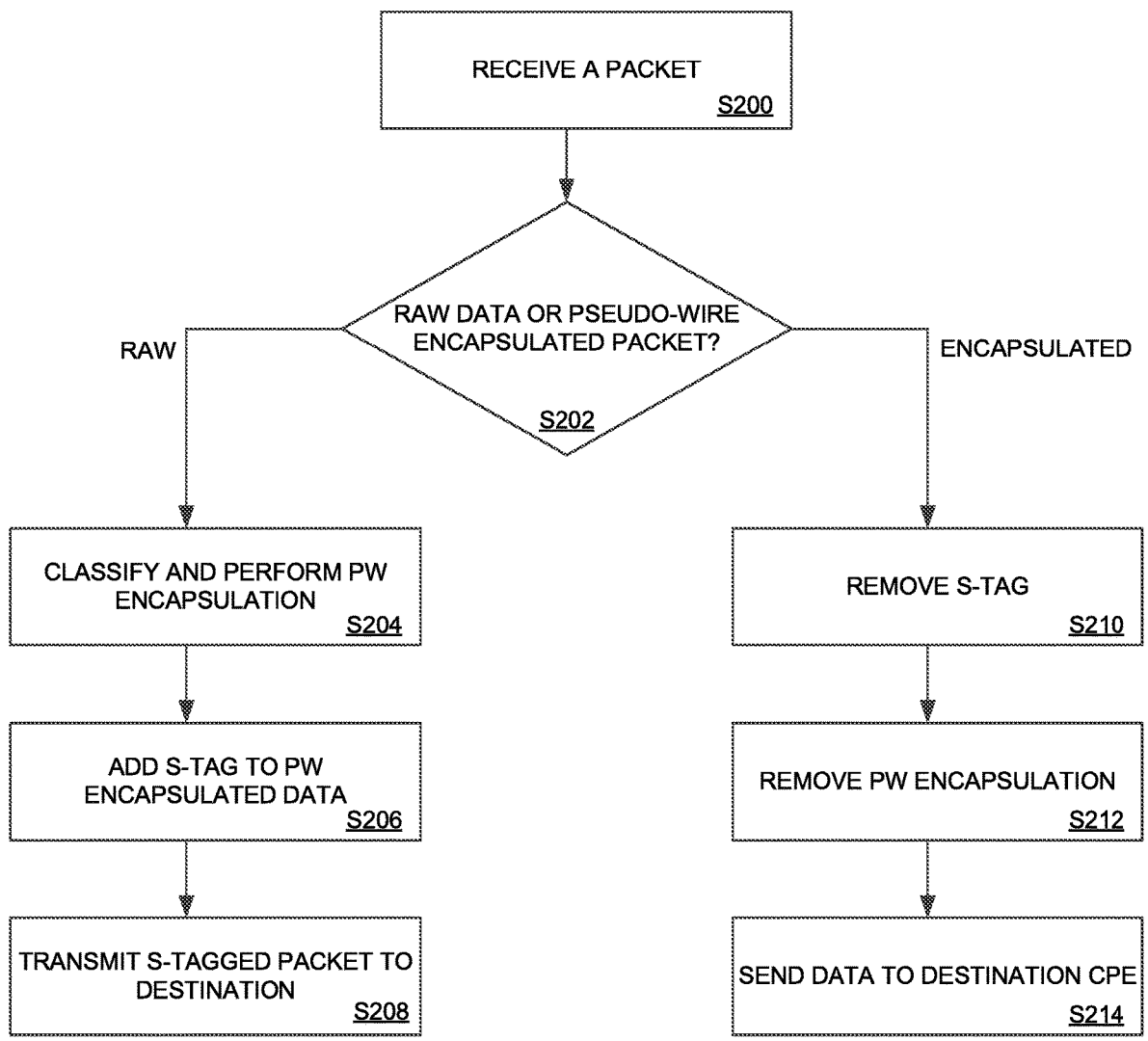
FIG. 2 illustrates a method of providing transparent Ethernet private line services, according to an aspect of the present disclosure.
Figures 3A, 3B, 3C:
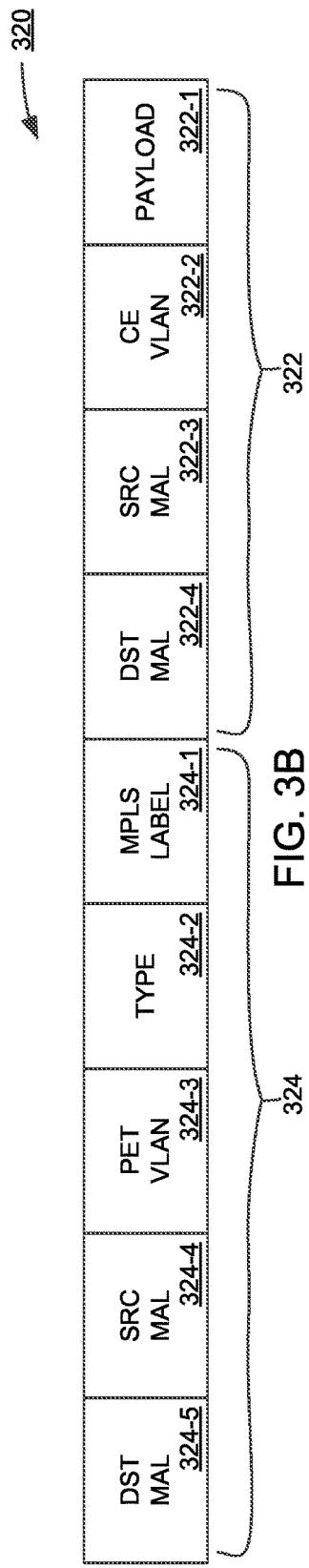
FIGS. 3A-C illustrate example structures of packets at different components as packets traverse the system of FIG. 1, according to an aspect of the present disclosure.

FIG. 2 illustrates a method of providing transparent Ethernet private line services, according to an aspect of the present disclosure. FIG. 2 will be described from the perspective of NID 106. However, it should be understood that NID 106 can have one or more associated memories storing computer-readable instructions that can be executed by one or more associated processors of NID 106 to implement functionalities described above with reference to FIG. 2. While FIG. 2 will be described from the perspective of NID 106, FIG. 2 can also be implemented by NID 118 at site B 116 in the same manner. Furthermore, FIG. 2 will be described in conjunction with FIG. 3. FIGS. 3A-C illustrate example structures of packets at different components as packets traverse the system of FIG. 1, according to an aspect of the present disclosure.

In describing FIG. 2 an assumption is made that data packets include a payload, a destination address and a source address, each of which can be a MAC address. These data packets originate from a source (e.g., a CPE 104) and are destined for a destination (e.g., a CPE 120). Similarly, data packets can originate from a CPE 120 and be destined for a CPE 104. In other words, a CPE 104 or a CPE 120 can be both an originator of a data packet or a destination of a data packet.

As noted above, the objective of implementing method of FIG. 2 is to provide a transparent EPL service over off-net EVPL facilities of a "last-mile"/third party service provider using pseudo-wire with static labels that are far more efficient and economically feasible compared to known methods that utilize MPLS on routers and switches that require execution of complex protocol stacking and hence are significantly more costly. In other words, the objective of FIG. 2 is to ensure that all data packets destined to or originating from any one end of system 100 can pass through the switches and routers at the off-net sites without being dropped.

At operation S200, NID 106 receives a packet from CPE 104.

At operation S202, NID 106 determines if the received packet is a raw data packet or a pseudo-wire (PW) encapsulated packet. If the received packet is a raw data packet, NID 106 proceeds to perform operations S204, S206 and S208 (first process or pseudo-wire capsulation process). However, if the received packet is a PW encapsulated packet, NID 106 proceeds to perform operations S210, S212 and S214 (second process or pseudo-wire de-capsulation process). The first process (i.e., that is when the packet received at S200 is a raw data packet) is explained first.

As noted the data packet can have a payload, a destination MAC address and a source MAC address. FIG. 3A illustrates an example structure of data packet 300 that is received at NID 106. Data packet 300 includes payload 302, source address (SA) 304 and destination address (DA) 306.

At operation S202, NID 106 examines data packet 300, classifies data packet 300 and performs a PW encapsulation process thereon. By examining data packet 300 and DA 306, NID 106 can determine that data packet 300 belongs to a subscriber of transparent EPL service being provided and thus assigns data packet 300 a high priority in its queue for being serviced.

PW encapsulation process of operation S204 is as follows. NID 106 adds static PW header to data packet 300 (e.g., an MPLS label) and marks the same as MPLS Experimental (MPLS EXP). By doing so, NID 106 modifies data packet 300 so that payload 302, SA 304 and DA 306 all appear as a frame (payload). Accordingly, a static PW header is added to data packet 300, resulting in a PW packet. As shown in FIG. 3B payload 302, SA 304 and DA 306 of FIG. 3A appear as "payload" or a frame to subsequent switches at off-net network 108, as will be described below.

At operation S206, NID 106 adds a PET Service Tag (S-Tag) to the pseudo-wired packet. FIG. 3B illustrates example structure of a resulting PW packet 320 that includes frame 322 and static PW header 324. As shown in FIG. 3B, frame 322 can have a certain size (e.g., 1518 bytes without CE VLAN information or 1522 with CE VLAN information) and is formed of payload 322-1 (which is the same as payload 302, SA 304 and DA 306 of packet 300 shown in FIG. 3A), CE VLAN 322-2 (optional), Source MAC address 322-3 and destination MAC address 322-4 (which can be the same as SA 304 and DA 306). Moreover, static PW header 324 can have a certain size (e.g., 22 bytes) and is formed of MPLS label 324-1, type 324-2, PET VLAN 324-3, Source MAC address 324-4 and Destination MAC address 324-5 (source MAC address 324-4 and destination MAC address 324-5 are specific to the EPL service provider and are different than SA 304 and DA 306).

At operation S208, NID 106 sends PW packet to off-net network 108. At Off-net network 108 and due to PW encapsulation process, PW packet appears as unicast to Finished E-ENNI 109 (Finished E-ENNI 109 is un-aware of payload of PW packet received). Thereafter, Finished E-ENNI 109 pushes/adds ESP VLAN Ethernet Tag (E-Tag) to the received PW packet.

FIG. 3C illustrates example structure of a E-tagged PW packet. As shown, E-tagged PW packet 350 includes frame 352 (which is the same as frame 322 of FIG. 3B), static PW header 354 (which is the same as static PW header 324 of FIG. 3) and the added E-tag 356, which also include a corresponding source and destination MAC address specific to the off-net site and different from SA 304, DA 306, source MAC address 324-4 and destination MAC address 324-5.

The E-tagged PW packet is then sent to NN 110, where NN 110 removes the E-tag and forwards PW packet based on PET S-Tag VLAN to ME 112 that is communicating with NID 118 over metro network 114.

ME 112 switches (forwards) PW packet to NID 118 over metro core 114 based on PET S-Tag of PW packet.

Upon receiving the PW packet over metro core 114, NID 116 removes PET S-Tag VLAN as well as the static PW header and retrieves data packet 300, which is then forwarded to a destination CPE 120 based on DA 306 of data packet 300.

Transparency of the EPL service provided to deliver data packet 300 from CPE 104 to CPE 106 is reflected in that during the transmission process, Finished E-ENNI 109, NN 110, ME 112 and metro core 114 are all unaware of the payload 302, SA 304 and DA 306 of data packet 300 and thus all data packets destined for CPE(s) 120 at site B 116 are guaranteed to pass through off-net site equipment (i.e., Finished E-ENNI 109, NN 110 and ME 112).

With first process being described, the description now refers back to operation S202 for describing the second process, which involves receiving a PW packet at NID 106. In this case, a data packet originating from CPE 120 may have been PW encapsulated and S-Tagged at NID 116 and sent over metro core 114, with E-Tag added at off-net site as described above and ultimately received at NID 106.

At Operation S210, NID 106 removes S-Tag of the received PW packet in the same way as described above.

At operation S212, NID 106 removes PW encapsulation of the received packet to retrieve the raw data packet that was received at NID 116 by the sending CPE 120. The raw data packet can have the same structure as data packet 300 of FIG. 3A.

At operation S214, NID 106 determines destination address of raw data packet and sends the raw data packet to the intended destination, which may be a CPE 104.

As noted process of FIG. 2 can be applied in the reverse order and in the same manner when a data packet is originated at a CPE 120 and is destined for a CPE 104. In this case, NID 116 can perform the operations of FIG. 2

The disclosure now turns to description of example systems that can be used as any one of NID 106, NID 116, Finished E-ENNI 109, NN 110, ME 112, etc.

Figure 4:
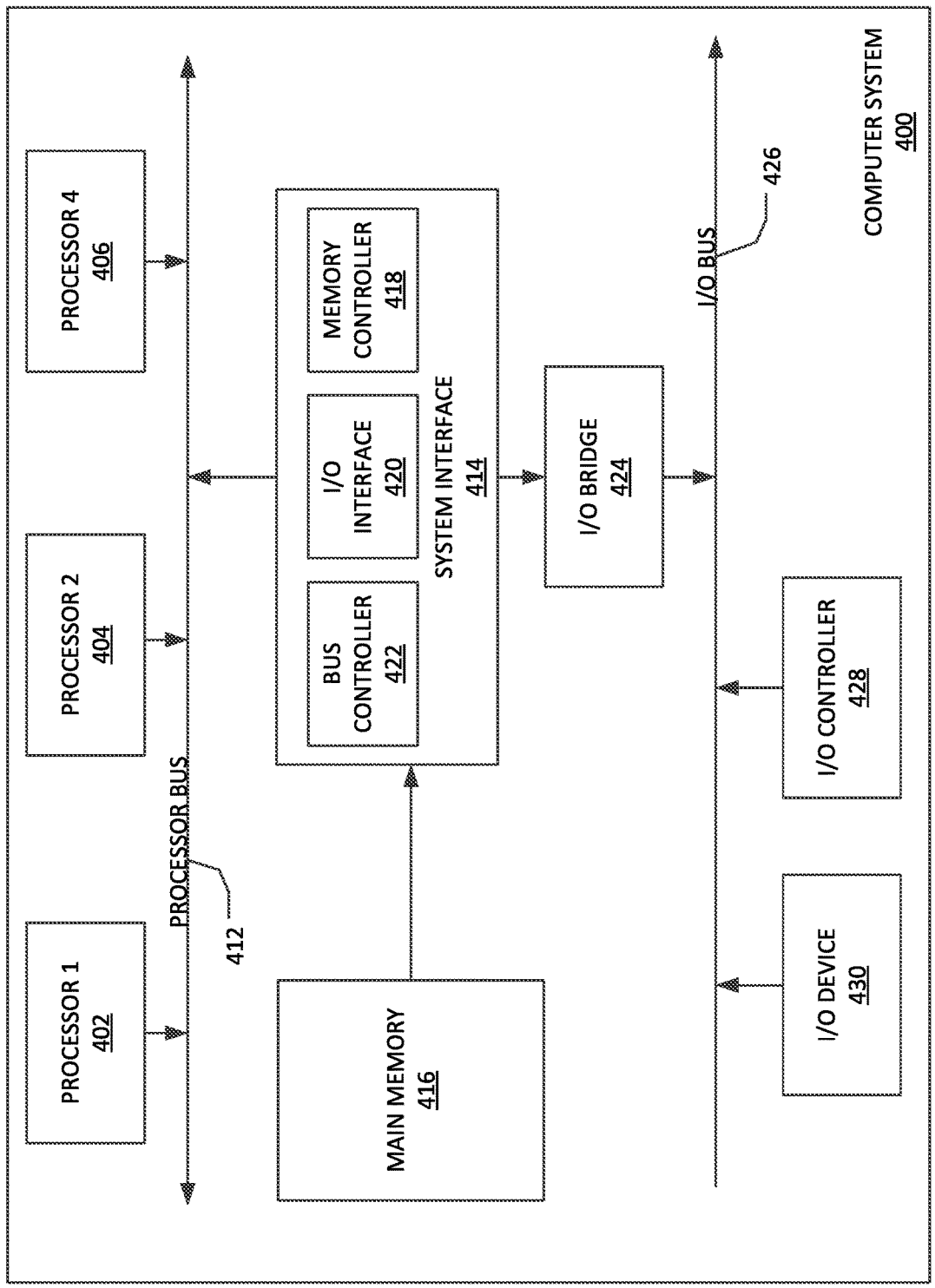
FIG. 4 is a diagram illustrating an example of a computing system which may be used in implementing examples of the present disclosure, according to one aspect of the present disclosure.

FIG. 4 is a diagram illustrating an example of a computing system which may be used in implementing examples of the present disclosure, according to one aspect of the present disclosure. is an example of FIG. 4 is a block diagram illustrating an example of a computing device or computer system 400 which may be used in implementing the embodiments of the network disclosed above. In particular, the computing device of FIG. 4 is one embodiment of the server or other networking component that performs one of more of the operations described above. The computer system (system) includes one or more processors 402-406. Processors 402-406 may include one or more internal levels of cache (not shown) and a bus controller or bus interface unit to direct interaction with the processor bus 412. Processor bus 412, also known as the host bus or the front side bus, may be used to couple the processors 402-406 with the system interface 414. System interface 414 may be connected to the processor bus 412 to interface other components of the system 400 with the processor bus 412. For example, system interface 414 may include a memory controller 418 for interfacing a main memory 416 with the processor bus 412. The main memory 416 typically includes one or more memory cards and a control circuit (not shown). System interface 414 may also include an input/output (I/O) interface 420 to interface one or more I/O bridges or I/O devices with the processor bus 412. One or more I/O controllers and/or I/O devices may be connected with the I/O bus 426, such as I/O controller 428 and I/O device 430, as illustrated.

I/O device 430 may also include an input device (not shown), such as an alphanumeric input device, including alphanumeric and other keys for communicating information and/or command selections to the processors 402-406. Another type of user input device includes cursor control, such as a mouse, a trackball, or cursor direction keys for communicating direction information and command selections to the processors 402-406 and for controlling cursor movement on the display device.

System 400 may include a dynamic storage device, referred to as main memory 416, or a random access memory (RAM) or other computer-readable devices coupled to the processor bus 412 for storing information and instructions to be executed by the processors 402-406. Main memory 416 also may be used for storing temporary variables or other intermediate information during execution of instructions by the processors 402-406. System 400 may include a read only memory (ROM) and/or other static storage device coupled to the processor bus 412 for storing static information and instructions for the processors 402-406. The system set forth in FIG. 4 is but one possible example of a computer system that may employ or be configured in accordance with aspects of the present disclosure.

According to one example embodiment, the above techniques may be performed by computer system 400 in response to processor 404 executing one or more sequences of one or more instructions contained in main memory 416. These instructions may be read into main memory 416 from another machine-readable medium, such as a storage device. Execution of the sequences of instructions contained in main memory 416 may cause processors 402-406 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 416. Common forms of machine-readable medium may include, but is not limited to, magnetic storage medium (e.g., floppy diskette); optical storage medium (e.g., CD-ROM); magneto-optical storage medium; read only memory (ROM);

random access memory (RAM); erasable programmable memory (e.g., EPROM and EEPROM); flash memory; or other types of medium suitable for storing electronic instructions.

Example embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

We claim:

1. A method of providing transparent Ethernet private line service, the method comprising:
   receiving, at a network interface device of an enterprise network, a packet, the enterprise network being configured to receive the Ethernet private line service from a service provider;
   determining, by the network interface device, whether the packet is a raw data packet or a statically pseudo-wired packet;
   performing, by the network interface device, a pseudo-wire encapsulation process in response to the packet being the raw data packet and a pseudo-wire de-capsulation process in response to the packet being the statically pseudo-wired packet, prior to delivering the packet to a corresponding destination, wherein the pseudo-wire encapsulation process comprises:
      adding a multiprotocol label switching (MPLS) label to the raw data packet to yield a pseudo-wired packet (PW packet); and
      adding a Service Tag (S-Tag) to the PW packet; and
   sending the PW packet to an off-net Ethernet Virtual Private Line Facility, wherein
   at the off-net Ethernet Virtual Private Line Facility, an Ethernet Tag (E-Tag) is added to the PW packet and transmitted to a network to network interface (NNI) for transmission to a customer premise equipment (CPE) of a customer over a metro core, and
   upon arrival at a site of the customer, another network interface device, performs the pseudo-wire de-capsulation process to retrieve the raw data packet for transmission to the CPE.

2. The method of claim 1, wherein the network interface device does not require any protocol stacking for implementing MPLS.

3. The method of claim 1, wherein the pseudo-wire encapsulation process prevents the off-net Ethernet Virtual Private Line Facility from dropping the raw data packet by hiding content of the raw data packet from the off-net Ethernet Virtual Private Line Facility.

4. The method of claim 3, wherein the content includes a payload, a source address, and a destination address of the raw data packet.

5. The method of claim 1, wherein the pseudo-wire de-capsulation process comprises:
   removing a service tag of the packet;
   removing a pseudo-wire header of the packet to yield a raw data packet;
   determining a destination address of the raw data packet; and
   sending the raw data packet to the destination.

6. A system configured to provide transparent Ethernet private line service, the system comprising:
   a service provider;
   an off-net Ethernet Virtual Private Line Facility;
   a network to network interface (NNI);
   a customer premise equipment (CPE); and
   a device, the device comprising:
      memory having computer-readable instructions stored therein; and
      one or more processors configured to execute the computer-readable instructions to:
         receive a packet, the device being configured as a component of an enterprise network that receives the Ethernet private line service from the service provider;
         determine whether the packet is a raw data packet or a statically pseudo-wired packet;
         perform a pseudo-wire encapsulation process in response to the packet being the raw data packet and a pseudo-wire de-capsulation process in response to the packet being the statically pseudo-wired packet, prior to delivering the packet to a corresponding destination, wherein the pseudo-wire encapsulation process comprises:
            adding a multiprotocol label switching (MPLS) label to the raw data packet to yield a pseudo-wired packet (PW packet); and
            adding a Service Tag (S-Tag) to the PW packet; and
         send the PW packet to the off-net Ethernet Virtual Private Line Facility, wherein
         at the off-net Ethernet Virtual Private Line Facility, an Ethernet Tag (E-Tag) is added to the PW packet and transmitted to the NNI for transmission to the CPE of a customer over a metro core, and
         upon arrival at a site of the customer, another network interface device, performs the pseudo-wire de-capsulation process to retrieve the raw data packet for transmission to the CPE.

7. The system of claim 6, wherein the device does not require any protocol stacking for implementing MPLS.

8. The system of claim 6, wherein the pseudo-wire encapsulation process prevents the off-net Ethernet Virtual Private Line Facility from dropping the raw data packet by hiding content of the raw data packet from the off-net Ethernet Virtual Private Line Facility.

9. The system of claim 8, wherein the content includes a payload, a source address and a destination address of the raw data packet.

10. The system of claim 6, wherein the pseudo-wire de-capsulation process comprises:
   removing a service tag of the packet;
   removing a pseudo-wire header of the packet to yield a raw data packet;
   determining a destination address of the raw data packet; and
   sending the raw data packet to the destination.

* * * * *